US009544688B1

United States Patent

Knoblock

(10) Patent No.: US 9,544,688 B1

(45) Date of Patent: Jan. 10, 2017

(54) LOW CROSS-TALK HEADSET

(71) Applicant: Clear-Com, LLC, Alameda, CA (US)

(72) Inventor: Karl Knoblock, Encinitas, CA (US)

(73) Assignee: Clear-Com, LLC, Alameda, CA (US)

( * ) Notice: Subject to any disclaimer, the term of this patent is extended or adjusted under 35 U.S.C. 154(b) by 197 days.

(21) Appl. No.: 14/167,856

(22) Filed: Jan. 29, 2014

(51) Int. Cl.

| | |
|---|---|
| ***G01K 11/16*** | (2006.01) |
| ***H04R 3/00*** | (2006.01) |
| *H04R 25/00* | (2006.01) |

(52) U.S. Cl.

CPC .................................... *H04R 3/002* (2013.01)

(58) Field of Classification Search

CPC ..... H04M 1/05; H04M 1/19; H04R 2201/107; H04R 1/105; H04R 1/1066; H04R 1/342; H04R 1/345; H04R 1/10; H04R 1/1083; H04R 2201/109; H04R 1/08; H04R 1/1075; H04R 2410/05; H04R 2460/01; H04R 29/001; H04R 29/004

USPC ......... 381/330, 370, 381, 71.6, 74, 92, 94.7; 379/430; 455/575.2

See application file for complete search history.

(56) References Cited

U.S. PATENT DOCUMENTS 4,987,592 A 1/1991 Flagg ............................ 379/430
5,404,577 A 4/1995 Zuckerman
5,808,239 A 9/1998 Olsson
6,201,190 B1 * 3/2001 Pope .................. H01B 11/1826 174/102 R
6,466,681 B1 * 10/2002 Siska, Jr. ............. H04R 5/0335 381/370
6,741,718 B1 5/2004 Brumitt et al. ............... 381/370
7,899,194 B2 3/2011 Boesen ........................... 381/79
2004/0037444 A1 * 2/2004 Redmer ............... H04R 1/1058 381/370
2009/0238398 A1 9/2009 Connors et al. .............. 381/375
2009/0245529 A1 * 10/2009 Asada .................. G10K 11/178 381/71.6

FOREIGN PATENT DOCUMENTS

CA 2070956 A1 12/1992
WO 2005/104604 11/2005

OTHER PUBLICATIONS

"Rugged Air RA950" ANR Headset—http://www.mypilotstore.com/mypilotstore/sep/7366MyPilotStore.com, retrieved Nov. 18, 2013, 8 pages.

"AN-1000H (for helicopter) Aviation Headset", Sintrade AG, CH8600 Dubendorf, http://web.archive.org/web/20140129182227/http://www.sintrade.ch/hs/AN-1000.pdf, retrieved Nov. 18, 2013, 6 pages.

(Continued)

*Primary Examiner* — Paul S Kim

*Assistant Examiner* — Norman Yu

(74) *Attorney, Agent, or Firm* — Sheppard Mullin Richter & Hampton LLP

(57) ABSTRACT

A headset for receiving and transmitting audio signals having a frame configured to retain the headset on the user, one or more earphones mounted to the frame of the headset at a first position, one or more microphones mounted to the frame of the headset in a second position separate from the first position, one or more electrical earphones, one or more electrical microphones, wherein the one or more electrical microphone wires are isolated from the one or more electrical earphone wires.

18 Claims, 7 Drawing Sheets

(56) References Cited

OTHER PUBLICATIONS

"Military Aviation Headsets", http://www.davidclark.com/PDF-files/19542P78.pdf, 2012, retrieved Nov. 18, 2013, 7 pages.
"Boom Microphone 92A001", http://www.alltronics.com/mas_assets/acrobat/92A001.pdf, Jan. 5, 2009, retrieved Nov. 18, 2013, 6 pages.

* cited by examiner

LOW CROSS-TALK HEADSET

FIELD OF THE DISCLOSURE

This disclosure relates to an apparatus for conveying audio signals to and from a user, specifically a headset for conveying audio signals to and from a user.

BACKGROUND

Headsets having earphones for conveying audio signals to a wearer and/or user of the headset from one or more audio signal generators and/or speakers are known. Headsets having microphones for conveying audio signals from the user to one or more listeners and/or recording devices are also known.

A standard headset typically comprises of one or two earphones adapted to be worn by a user, such that the one or more earphones are positioned adjacent to the user's ears. Many headsets also comprise a microphone wherein the microphone is attached to the headset such that it is positioned near the user's mouth. The electrical wires connecting the one or two earphones and the microphone have been previously housed inside a single electrical cable running between the one or more electrical sockets into which the electrical cable is plugged, to where the electrical wires extend to the earphones and/or microphones. As a result, the electrical wire for the earphones and the electrical wire for the microphone are in close proximity to each other. With such conventional headphones, substantial electrical coupling between the earphone audio signals and the microphone audio signals in the single cable has been found.

Additionally, substantial acoustical and mechanical coupling from the earphone to the microphone through the frame of the headset has been found. In prior art headsets, the microphone of the headset is attached to the headset at a position adjacent to the earphone of the headset. The close proximity of the microphone structure and the earphone structure causes substantial acoustical and/or mechanical coupling between the microphone and earphone audio signals. Typically, tube-type microphone booms have been used to facilitate positioning the microphone by the user's mouth to receive vocal audio signals. The tube-type microphone booms, comprising a tube between the microphone and the attachment to the frame of the microphone at the earphone, have been found to cause acoustical and/or mechanical coupling between the microphone and earphone audio signals.

As a result of the substantial electrical, acoustical, and mechanical coupling, there is substantial cross-talk between the earphone audio signals and the microphone audio signals. The audio signals, which are transmitted through the earphones to the wearer, are transmitted through the microphone and the microphone electrical wires. These signals can be heard by a listener to the microphone audio and/or recorded by recording equipment attached to the microphone.

In some circumstances, the audio signals transmitted through the electrical wires connected to the earphones and transmitted to the user of the headset must not be recorded by recording equipment in electrical connection with the microphone and/or listened to by persons listening to the microphone audio signals. The user of the headset may be receiving instructions from one person through the earphones while conversing with another person through the microphone.

SUMMARY

Disclosed is a new headset design that overcomes the deficiencies of the prior art and substantially reduces the amount of cross-talk between the earphone audio signals and the microphone audio signals. Cross-talk is a phenomenon by which a signal transmitted on one circuit, channel, or transmission system (e.g., a wire) creates an undesired effect in another circuit, channel, or transmission system. Cross-talk is usually caused by undesired electrical, acoustical, mechanical (inductive, or conductive) coupling from one circuit, channel, or transmission system to another.

Disclosed is a headset for receiving and transmitting audio signals. The headset may comprise a frame configured to retain the headset on the user. The frame may be configured to securely and comfortably secure the headset on the user's head. The frame may be configured to securely support one or more elements of the headset. The frame may be flexible to facilitate bending of the frame to shape the frame to the user's head. The frame may be adjustable to allow the headset to be configured for use by multiple users having different-sized heads. The frame may comprise of an elasticated material, such as metal, plastic, and/or other elasticated material, configured to produce pressure against the user's head so that the headset is maintained securely on the user's head.

The headset may comprise one or more earphones. The earphones may be configured to provide audio signals to a user of the headset. One or more earphones may be mounted to the frame of the headset at a first position. The first position may comprise a location on the frame of the headset adjacent to an ear of the user when the user is wearing the headset. The first position may be such that when the headset is being worn by the user, the earphone is positioned adjacent to the user's ear and orientated so that audio signal can be heard by the user through the earphone. The earphone may be mounted to the frame of the headset. Where the earphone mounts to the frame of the headset, dampeners may be used to reduce the mechanical coupling between the earphone and the frame. Insulators may be used where the earphone mounts to the frame of the headset to reduce the electrical coupling between the earphone and the frame.

The headset may comprise one or more microphones. The microphones may be configured to receive audio signals from the user of the headset. One or more microphones may be mounted to the frame of the headset in a second position separate from the first position. The second position may comprise a location on the frame of the headset adjacent to a temple of the user opposite the first ear. Where the first position is adjacent to an ear of the user when the user wears the headset, the second position may be adjacent to a temple of the user, wherein the first temple is near the second ear opposite the first ear of the user adjacent to the earphone. The one or more microphones may comprise microphones configured to facilitate active noise cancellation of acoustical signals separate from the user's voice.

Having the microphone positioned on the opposite side of the headset from the earphone increases the distance between the microphone attachment and the earphone attachment. Increasing the distance between the attachments of the microphone and the earphone reduces the acoustical and/or mechanical coupling between the microphone and the earphone and therefore reduces the cross-talk between the earphone audio signal and the microphone audio signal.

The headset may comprise one or more electrical earphone wires associated with individual ones of the one or more earphones. The one or more electrical earphone wires may be configured to carry audio signals to individual ones of the one or more earphones.

The headset may comprise one or more electrical microphone wires associated with individual ones of the one or more microphones. The one or more electrical microphone wires may be configured to carry audio signals from individual ones of the one or more microphones. The one or more electrical microphone wires may be isolated from the one or more electrical earphone wires.

The one or more electrical earphone wires and the one or more electrical microphone wires may comprise double-shielded electrical cables. The double-shielded electrical cables may be configured to reduce transmission of electrical signals between the one or more electrical earphone wires and the one or more electrical microphone wires. Reducing the transmission of electrical signals between the one or more electrical earphone wires and the one or more electrical microphone wires reduces the electrical coupling between the wires and therefore reduces the cross-talk between the audio signal from the earphone(s) and the audio signal from the microphone(s).

The one or more electrical microphone wires may be separate from the one or more electrical earphone wires. The one or more electrical microphone wires may be separate from the one or more electrical earphone wires along the entire length or substantially the entire length of the one or more electrical earphone wires and the one or more electrical microphone wires. The one or more electrical microphone wires may be configured to reduce electrical crosstalk between the one or more electrical microphone wires and the one or more electrical earphone wires. The one or more electrical microphone wires and the one or more electrical earphone wires may further comprise spacers disposed between the one or more electrical microphone wires and the one or more electrical earphone wires. The spacers may be configured to physically separate the electrical microphone wires and the electrical earphone wires and may be positioned at discrete intervals along the length of the wires. The spacers may be configured to reduce electrical coupling, acoustical and/or mechanical coupling between the one or more electrical microphone wires and the one or more electrical earphone wires. The spacers may comprise an insulating material (e.g., rubber, plastic, and/or other insulating material).

The one or more microphones may and/or be attached to a wire-type microphone boom. The wire-type microphone boom may be configured to reduce the transmission of audio signals from the user through the frame of the headset. A wire-type microphone boom may be configured to avoid transmission of audio signals through the microphone boom such that acoustical and/or mechanical coupling between the microphone and/or earphone audio signal is reduced.

The frame of the headset may comprise a headband portion. The headband portion may be configured to receive the one or more electrical microphone wires and to guide the one or more electrical microphones across the headband portion to a location near the first position where the earphone is mounted to the frame of the headset.

A system may be provided comprising the headset, as described herein, and one or more physical processors configured, by machine-readable instructions, to reduce the audio signals that are transmitted from the one or more electrical earphone wires to the one or more electrical microphone wires. The one or more processors may be further configured to reduce the audio signals that are transmitted from the one or more earphones through the frame of the headset to the one or more microphones. Reducing the audio signals may comprise receiving a first audio signal and using adaptive algorithms configured to analyze the waveform of the first audio signal and to generate a second audio signal that causes a phase shift of the first audio signal or an inversion in the polarity of the first audio signal. Reducing the audio signals may further comprise amplifying the second audio signal, being the inverse of the first audio signal, and translate the second audio signal, using one or more transducers, such that the second audio signal is directly proportional to the first audio signal causing destructive interference with the first audio signal and thereby reducing the first audio signal.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
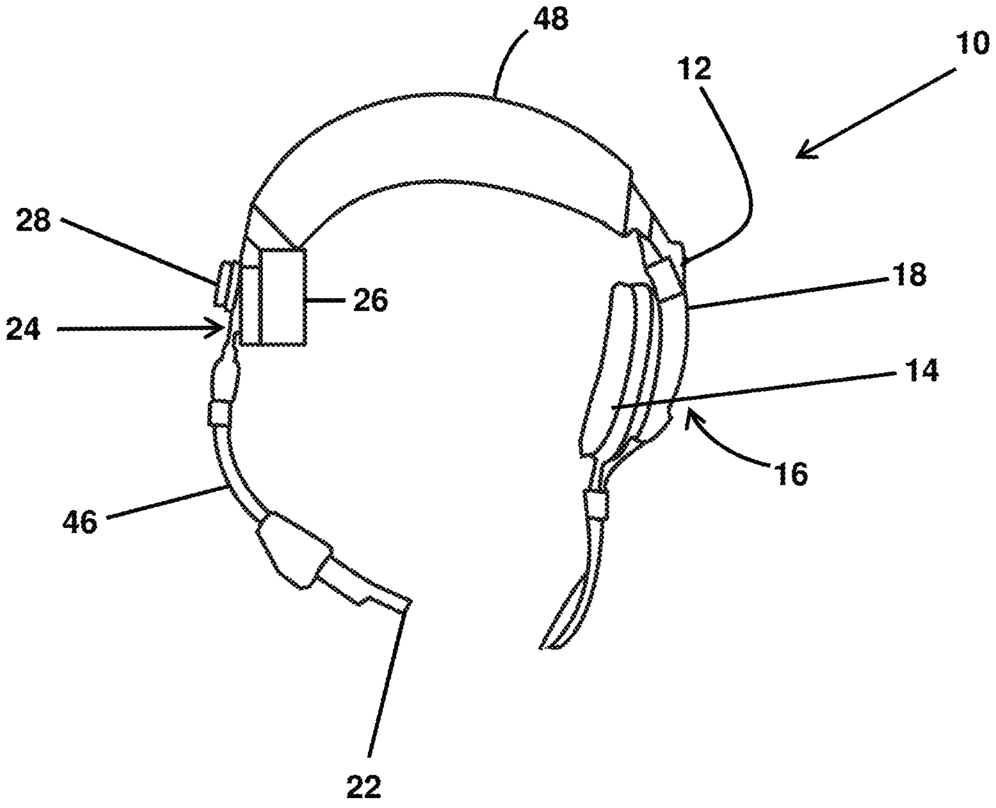
FIG. 1 illustrates a front view of a headset for receiving and transmitting audio signals, in accordance with one or more implementations.

FIG. 1 illustrates a front view of a headset 10 for receiving and transmitting audio signals, in accordance with one or more implementations. The headset 10 may comprise a frame 12 configured to retain the headset 10 on the user. The frame 12 may be configured to comfortably secure the headset 10 on the user's head. The frame 12 may be configured to securely support one or more elements of the headset 10. The frame 12 may be flexible to facilitate bending of the frame to shape the frame 12 to the user's head. The frame 12 may be adjustable to allow the headset 10 to be configured for use by multiple users having different-sized heads. The frame 12 may comprise of an elasticated material, (e.g., metal, plastic, and/or other elasticated material) configured to produce pressure against the user's head so that the headset 10 is maintained securely on the user's head.

The headset 10 may comprise one or more earphones 14. The earphones 14 may be configured to provide audio signals to a user of the headset 10. The one or more earphones 14 may be mounted to the frame 10 of the headset at a first position 16. The first position 16 may comprise a location on the frame 12 of the headset 10 adjacent to a first ear of the user when the user is wearing the headset 10. The first position 16 may be such that, when the headset 10 is being worn by the user, the earphone 14 is positioned adjacent to the user's ear, and orientated so that audio signal can be heard by the user through the earphone 14.

Figure 2:
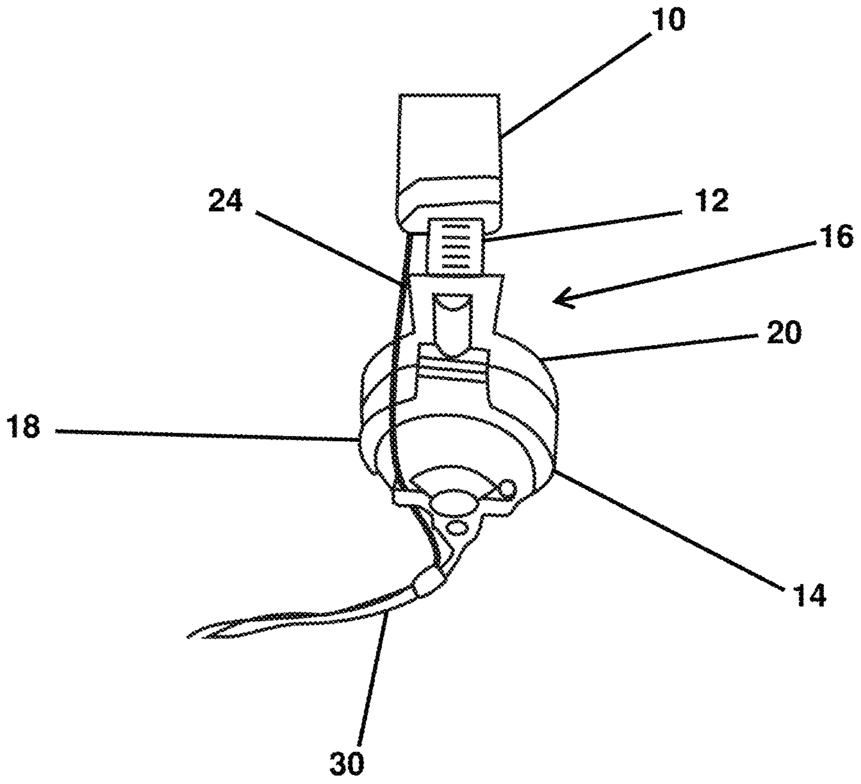
FIG. 2 illustrates a side view of a headset for receiving and transmitting audio signals, in accordance with one or more implementations.

FIG. 2 illustrates a side view of a headset 10 showing the first position 16 of the headset 10, in accordance with one or more implementations. The earphone 16 may be mounted to the frame of the headset 10. Where the earphone 14 mounts to the frame 12 of the headset 10, one or more insulators 18 may be used that are configured to reduce the mechanical coupling between the earphone 14 and the frame 12. Insulators 18 may be used where the earphone 14 mounts to the frame 12 of the headset 10 that are configured to reduce the electrical coupling between the earphone 14 and the frame 12.

The earphone 14 positioned in the first position 16 may further comprise an earphone pad 20, adapted to provide a cushion on and/or adjacent to the user's ear when the user is wearing the headset 10. This earphone pad 20 may also be configured to provide acoustical isolation of the audio signal transmitted through the one or more earphones.

Figure 3:
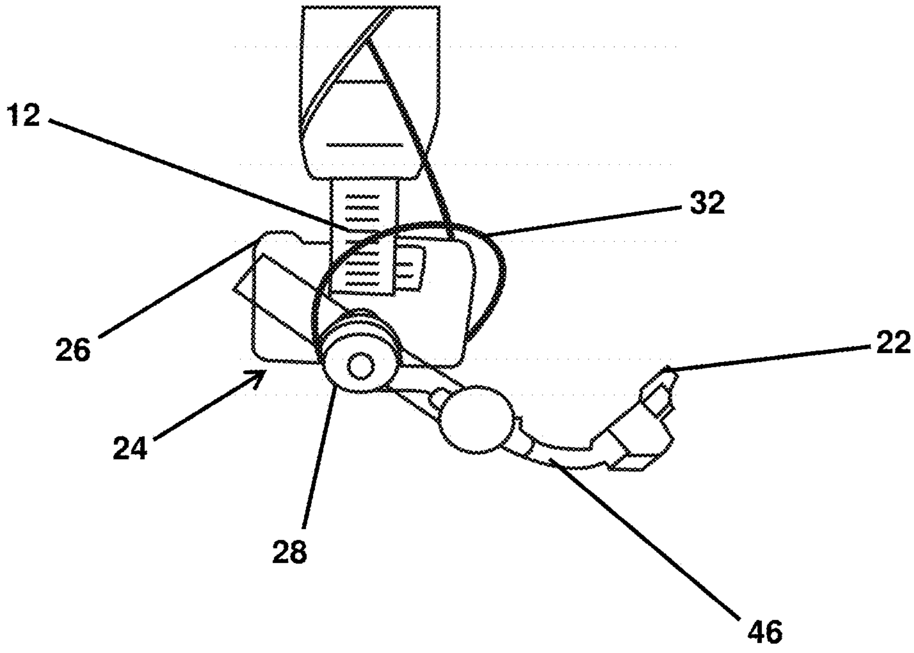
FIG. 3 illustrates a side view of a headset for receiving and transmitting audio signals, in accordance with one or more implementations.

With reference to FIG. 1, the headset 10 may comprise one or more microphones 22. The one or more microphones 22 may be configured to receive audio signals from the user of the headset 10. FIG. 3 illustrates a view of the second position 24 where the microphone boom 46 is positioned on the headset 10, in accordance with one or more implementations. The one or more microphones 22 and a microphone boom 46 may be mounted to the headband frame 12 of the headset 10 in a second position 24 separate from the first position 16. The one or more microphones and the microphone boom 46 may be mounted to the frame 12 of the headset 10 by a boom ratchet attachment 28. Boom ratchet attachment 28 may be configured to reduce the acoustical and/or mechanical coupling between the one or more microphones 22 and the frame 12 of the headset 10. For example, the boom attachment 28 may comprise one or more dampeners and/or insulators adapted to reduce acoustical and/or mechanical coupling. The second position 24 may comprise a location on the frame 12 of the headset 10 adjacent to the first temple of the user opposite the first ear. Where the first position 16 is adjacent a first ear of the user, when the user wears the headset, the second position 24 may be adjacent a first temple of the user, wherein the first temple is near the second ear, opposite the first ear of the user adjacent to the earphone 14.

The temple pad 26 may be positioned on the frame 12 at the second location 24 adapted to provide cushion for the user's temple when the user is wearing the headset 10.

Having the microphone 22 mounted on the opposite side of the headset 10 from the earphone 14 increases the distance between the microphone attachment 28 and the one or more earphone attachments 18. Increasing the distance between the microphone attachment 28 and the earphone attachment 18 reduces the acoustical and/or mechanical coupling between the microphone 22 and the earphone 14 and therefore reduces the cross-talk between the earphone audio signal and the microphone audio signal.

With reference to FIG. 2, the headset 10 may comprise one or more electrical earphone wires 30 associated with individual ones of the one or more earphones 14. The one or more electrical earphone wires 20 may be configured to carry audio signals to individual ones of the one or more earphones 14.

With reference to FIG. 3, the headset 10 may comprise one or more electrical microphone wires 32 associated with individual ones of the one or more microphones 22. The one or more electrical microphone wires 32 may be configured to carry audio signals from individual ones of the one or more microphones 22. The one or more electrical microphone wires 32 may be isolated from the one or more electrical earphone wires 30.

Figure 4:
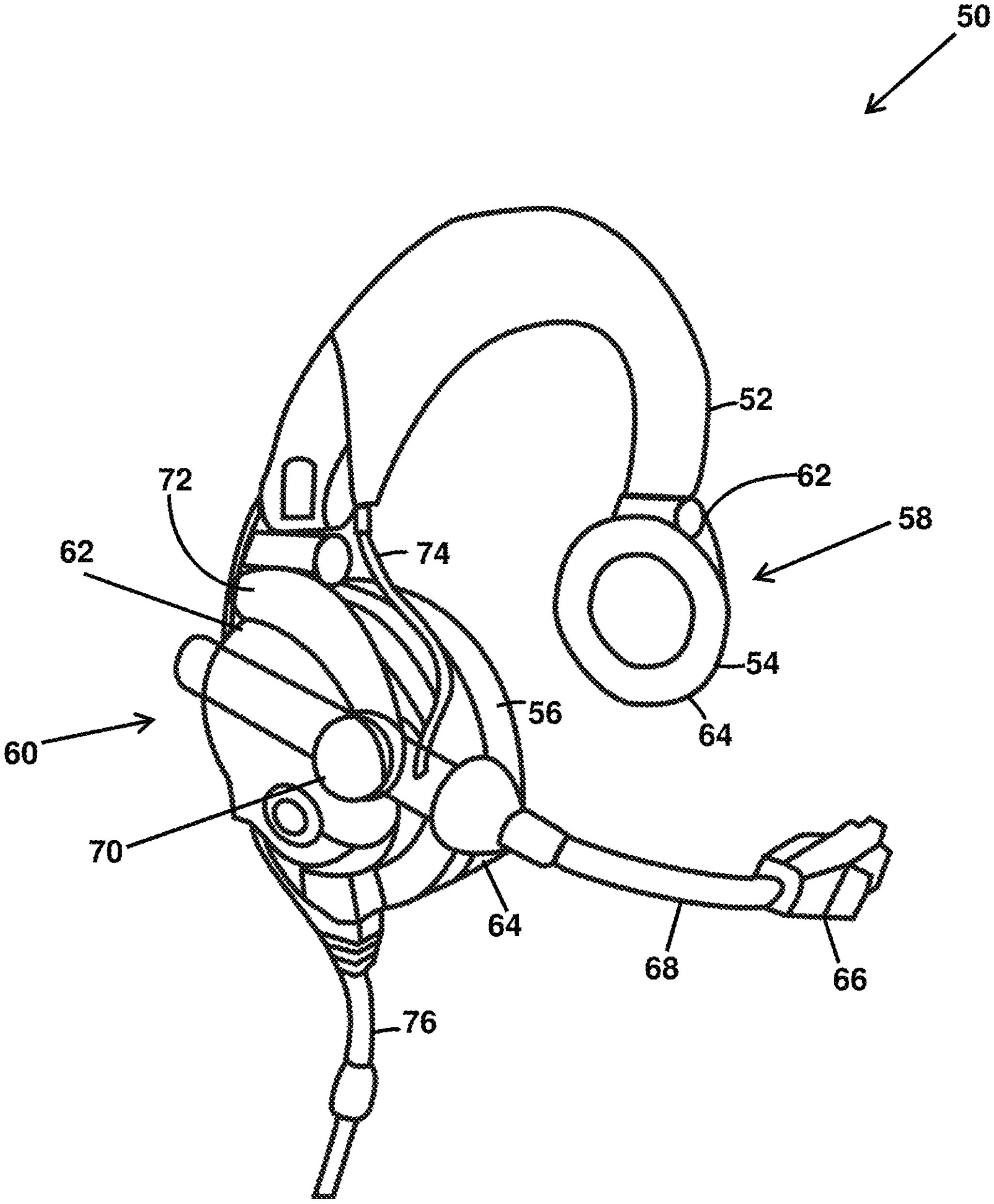
FIG. 4 illustrates a view of a headset for receiving and transmitting audio signals, in accordance with one or more implementations.

With reference to FIG. 4, illustrated is a headset 50 for receiving and transmitting audio signals, in accordance with one or more implementations. The headset 50 may comprise a frame 52 configured to retain the headset 50 on the user. The frame 52 of headset 50 may be similar to the frame 12 of headset 10 illustrated in FIGS. 1-3.

The headset 50 may comprise two earphones 54, 56. The first earphone 54 may be mounted to the headset at a first position 58 and may be configured to provide audio signals to a first ear of the user of the headset 50. The second earphone 56 may be mounted to the headset at a second position 60 and may be configured to provide audio signals to a second ear of the user of the headset 50.

Where the earphones 54, 56 are mounted to the frame 52 of the headset 10, one or more insulators 62 may be used that are configured to reduce the mechanical coupling between the earphones 54, 56 and the frame 52. Insulators 62 may be used where the earphones 54, 56 mount to the frame 52 of the headset 50 that are configured to reduce the electrical coupling between the earphones 54, 56 and the frame 52. The earphones 54, 56 may further comprise earphone pads 64, adapted to provide a cushion on and/or adjacent to the user's ear when the user is wearing the headset 50. This earphone pads 64 may also be configured to provide acoustical isolation of the audio signal transmitted through the one or more earphones.

The headset 50 may comprise one or more microphones 66. The one or more microphones 66 may be configured to receive audio signals from the user of the headset 50. The one or more microphones 66 and a microphone boom 68 may be mounted to the headband frame 52 of the headset 50 adjacent the second position 60, near the second earphone 56. The one or more microphones 66 and the microphone boom 68 may be mounted to the frame 52 of the headset 50 by a boom ratchet attachment 70. Boom ratchet attachment 70 may be configured to reduce the acoustical and/or mechanical coupling between the one or more microphones 66 and the frame 52 of the headset 50. For example, the boom attachment 70 may comprise one or more dampeners and/or insulators adapted to reduce acoustical and/or mechanical coupling.

The boom ratchet attachment 70 may be attached to the headset frame 52 at a location separate from the second earphone 56. A transition piece 72 may be disposed between the headset frame 52 and the boom ratchet attachment 70. In other embodiments the microphone boom 68 may be attached to the transition piece 72. The transition piece 72 may be configured to reduce the mechanical and/or electrical coupling between the microphone 66 and the earphone 56 audio signals. For example, the transition piece 72 may be a mechanical and/or electrical insulator adapted to reduce acoustical and electrical cross-talk. The illustration of transition piece 72 is not intended to be limiting, the transition piece may take any shape and attach at one or more locations. For example, the transition piece 72 may arc from a first location adjacent the second earphone 56 to a second location adjacent the second earphone 56. Such arc may form a semi-circle, a square, a rectangle, and/or other shape.

The headphone 50 may further comprise one or more electrical microphone wires 74 and one or more electrical earphone wires 76.

In some implementations, the headset 50 may comprise a frame 52 configured to retain the headset 50 on the user and may comprise two earphones 54, 56 at a first position 58 and a second position 60, as shown in FIG. 4. Additionally, as shown in FIG. 4, the headset 50 may comprise a microphone 66. The headset 50 may comprise a microphone boom 68. The microphone boom 68 may be mechanically connected to the frame 52 of the headset 50 at the second position 60. The headset 50 may comprise one or more electrical earphone wires 76 electronically connected to the earphone 54 at the first position. The headset 50 may comprise one or more electrical microphone wires 74 electronically connected to the microphone 66 and/or the microphone boom 68 at the second position 60. In such configurations, audio signals transmitted through the electrical earphone wires 76 and the electrical microphone wires 74 will have less mechanical and/or electrical coupling and thereby reduce cross-talk.

Figure 5:
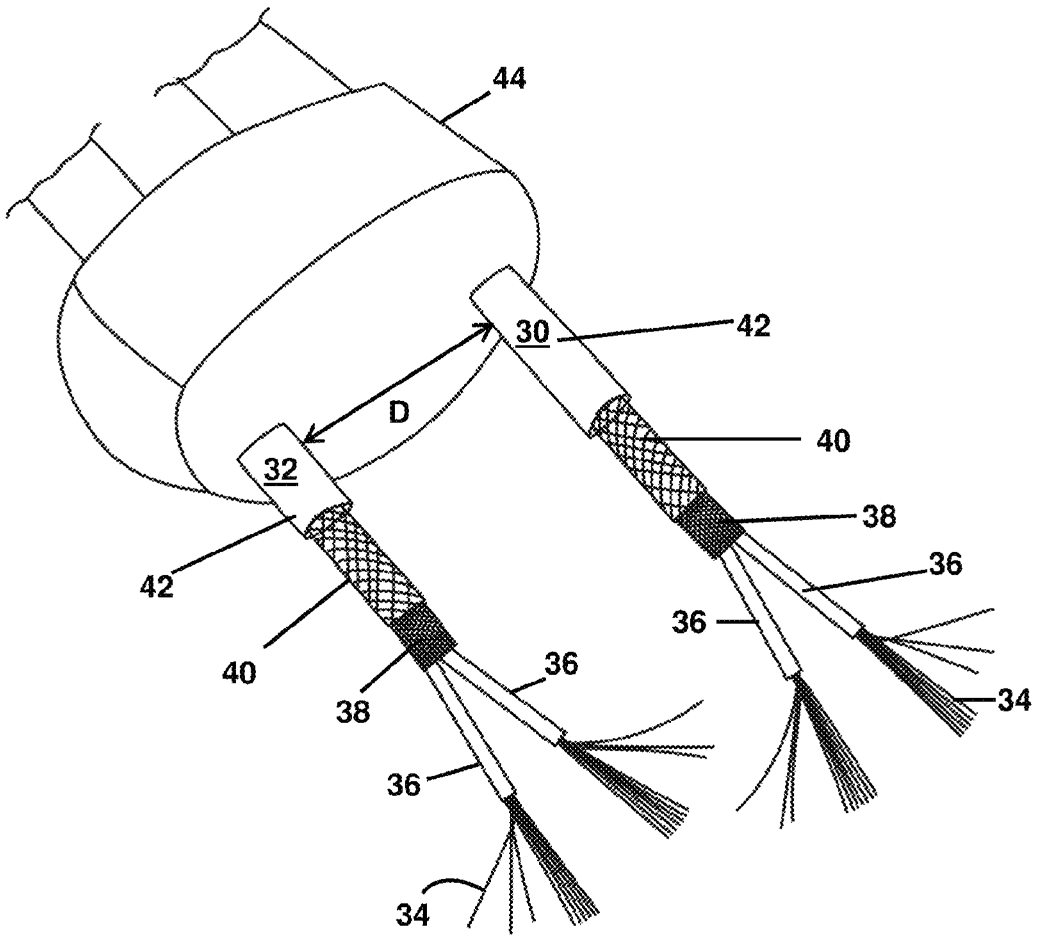
FIG. 5 illustrates a cross-section of the one or more wires for the headset, in accordance with one or more implementations.

FIG. 5 illustrates a cross-section of one or more wires for the headset 10, in accordance with one or more implementations. The one or more electrical earphone wires 30 and the one or more electrical microphone wires 32 may comprise double-shielded electrical cables. The double-shielded electrical cables may be configured to reduce transmission of electrical signals between the one or more electrical earphone wires and the one or more electrical microphone wires. The double-shielded electrical cables may comprise of one or more conductors 34, one or more insulation layers 36, a first shield 38, a second shield 40, an outer jacket 42, and/or other elements. Reducing the transmission of electrical signals between the one or more electrical earphone wires 30 and the one or more electrical microphone wires 32 reduces the electrical coupling between the wires and therefore reduces the cross-talk between the audio signal from the earphone(s) 14 and the audio signal from the microphone(s) 22.

The one or more electrical microphone wires 32 may be separate from the one or more electrical earphone wires 30. The one or more electrical microphone wires 32 may be configured to reduce electrical crosstalk between the one or more electrical microphone wires 32 and the one or more electrical earphone wires 30. The one or more electrical microphone wires 32 and the one or more electrical earphone wires 30 may further comprise one or more spacers 44 disposed between the one or more electrical microphone wires 32 and the one or more electrical earphone wires 30. The spacers 44 may be configured to physically separate the electrical microphone wires and the electrical earphone wires by a distance D and may be positioned at discrete intervals along the length of the wires. The separation of a distance D may be variable or constant throughout the length of the electrical wires, and is illustrated as an indication of that there may be a separation between the electrical wires. The spacers 44 may be configured such that the one or more electrical microphones wires 32 and the one or more electrical earphone wires 30 are physically separated along the length of the wires. The spacers 44 may be configured to reduce electrical coupling, acoustical and/or mechanical coupling between the one or more electrical microphone wires 32 and the one or more electrical earphone wires 30. The spacers 44 may comprise of an insulating material, for example, rubber, plastic, and/or other insulating material.

With reference to FIG. 3, the one or more microphones 22 may comprise a wire-type microphone boom 46. The one or more microphones 22 may attach to the wire-type microphone boom 46. The wire-type microphone boom 46 may be configured to reduce the transmission of audio signals from the user through the frame 12 of the headset 10. A wire-type microphone boom 46 may be configured to avoid transmission of audio signals through the microphone boom 46 such that acoustical and/or mechanical coupling between the microphone and/or earphone audio signal is reduced. A tube-type microphone boom may facilitate the transmission of audio signals through the tube of the microphone boom to the frame 12 through the microphone attachment 28.

With reference to FIG. 1, the frame 12 of the headset 10 may comprise a headband portion 48. The headband portion 48 may be configured to receive the one or more electrical microphone wires 32 and to guide the one or more electrical microphone wires 32 across the headband portion 48 to a location near the first position 16 where the earphone 14 is mounted to the frame 12 of the headset 10.

Figure 6:
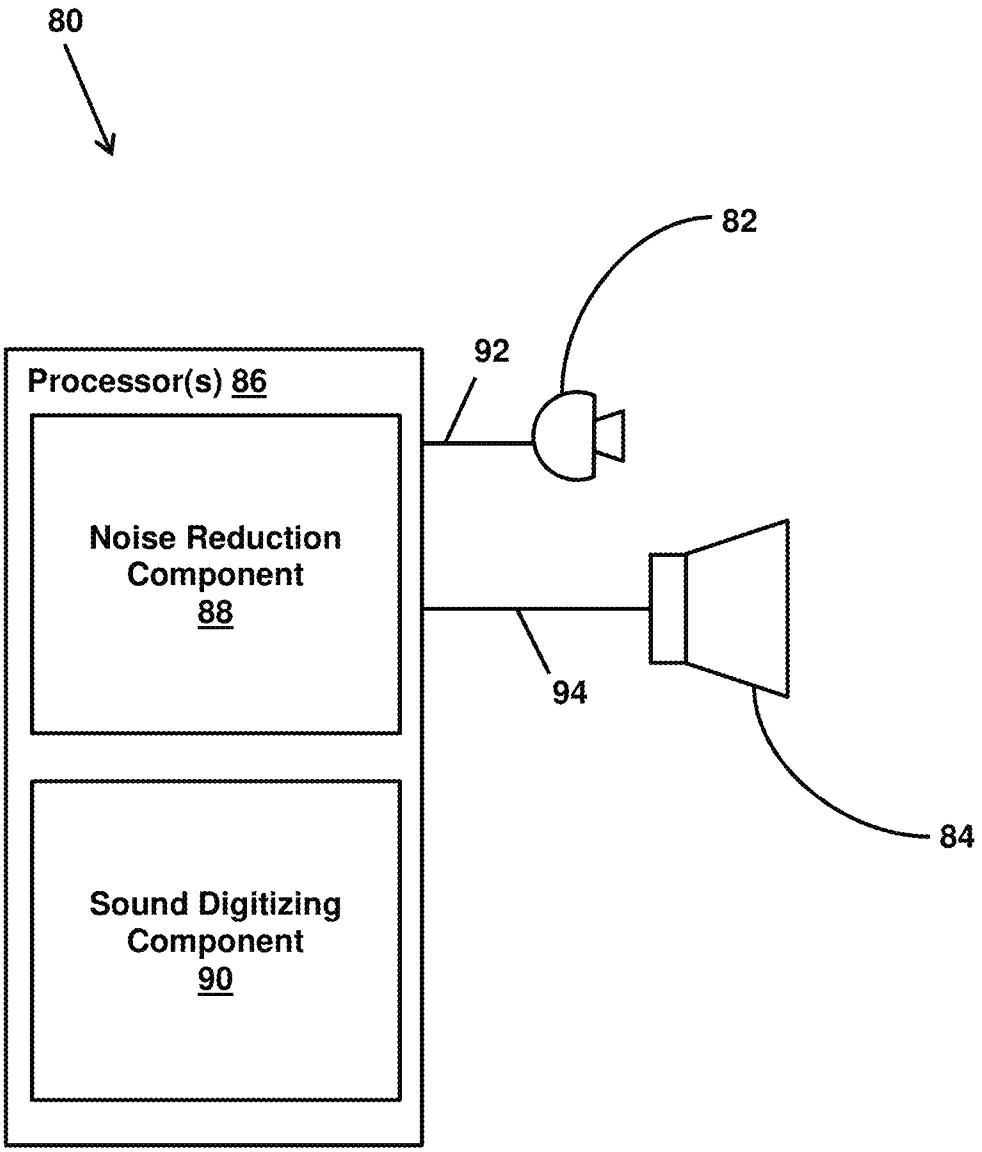
FIG. 6 illustrates a system for reducing audio signals, in accordance with one or more implementations.

FIG. 6 illustrates a system 80 for reducing audio signals, in accordance with one or more implementations. The system may be provided comprising the headset as described herein comprising one or more microphones 82 and one or more earphones 84. The system 80 may further comprise one or more physical processors 86 configured to execute computer components. The computer components may comprise a noise reduction component 88, a sound digitizing component 90, and/or one or more other components.

The noise reduction component 88 may be configured to reduce the audio signals that are transmitted between the one or more electrical microphone wires 94 electrical microphone wires 92 and the one or more electrical microphone wires 94. The noise reduction component 88 may be configured to reduce the audio signals that are transmitted from the one or more earphones 84 through the frame 12 (as shown in FIGS. 1-3) of the headset to the one or more microphones 22. Reducing the audio signals may comprise receiving a first audio signal and using adaptive algorithms configured to analyze the waveform of the first audio signal, and to generate a second audio signal that causes a phase shift of the first audio signal or an inversion in the polarity of the first audio signal. Reducing the audio signals may further comprise amplifying the second audio signal, being the inverse of the first audio signal, and translating the second audio signal, using one or more transducers, such that the second audio signal is directly proportional to the first audio signal, causing destructive interference with the first audio signal, thereby reducing the first audio signal.

The sound digitizing component 90 may be configured to transform the audio signal transmitted from the one or more earphones 14 from an analog audio signal to a digital audio signal. The sound digitizing component 90 may digitize the audio signal prior to, or during performance by, the noise reduction component 88.

Processor(s) 86 may be configured to provide information processing capabilities in system 80. As such, processor 86 may include one or more of a digital processor, an analog processor, a digital circuit designed to process information, an analog circuit designed to process information, a state machine, and/or other mechanisms for electronically processing information. Although processor 86 is shown in FIG.

6 as a single entity, this is for illustrative purposes only. In some implementations, processor 86 may include a plurality of processing units. These processing units may be physically located within the same device, or processor 86 may represent processing functionality of a plurality of devices operating in coordination. The processor 86 may be configured to execute components 86, 90, and/or other components. Processor 86 may be configured to execute components 86, 96, and/or other components by software, hardware, firmware, some combination of software, hardware, and/or firmware, and/or other mechanisms for configuring processing capabilities on processor 86.

Figure 7:
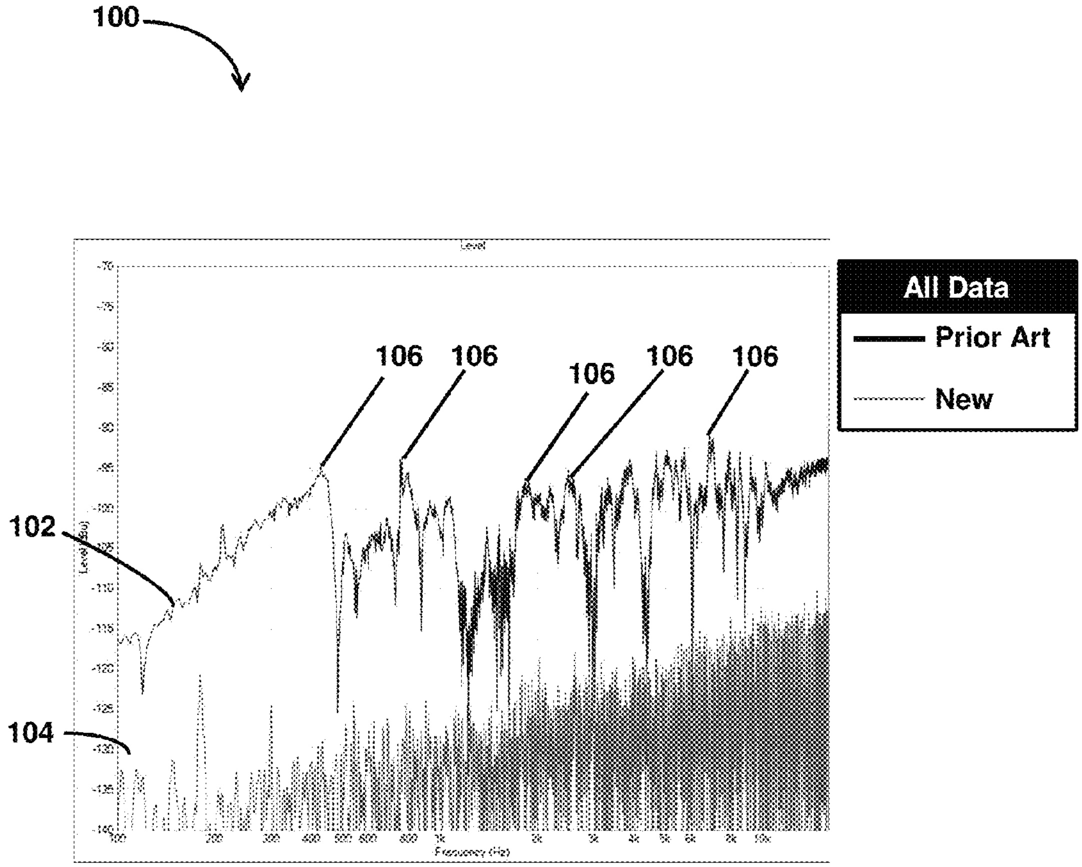
FIG. 7 illustrates a graph showing results of tests measuring cross-talk, in accordance with one or more implementations.

FIG. 7 illustrates a graph 100 showing results of tests measuring cross-talk, in accordance with one or more implementations. The graph 100 illustrates the decibel readings of a signal detected through the one or more microphones 22, when a 0 dBu audio signal was input to the one or more earphones 14 of the headset 10 and swept from 100 Hz to 15 kHz. The first dataset 102 illustrates the results when the audio signal was played through the prior art headset. As can be seen in the first dataset 102, there are numerous acoustical peaks 106 across the frequency band and the audio signal has a relatively high decibel level compared to the second dataset 104. The second dataset 104 illustrates the results when the audio signal was played through the presently disclosed headset 10. As can be seen in the second dataset 104, there are no audio acoustical peaks across the frequency band and the audio signal has a relatively low decibel level compared to the first dataset 102.

The headset 10 may comprise one, some, or all of the features described herein. The figures illustrated in this application are not intended to be limiting and the present disclosure is not limited to the exact embodiments shown in the Figures. The invention contemplated by this disclosure includes a headset having one or more of the elements described herein and is not limited to embodiments describing a headset having all of the elements described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A headset for receiving and transmitting audio signals comprising:

a frame configured to retain the headset on a user;

an earphone configured to provide audio signals to a user of the headset, wherein the earphone is supported by the frame of the headset at a first position, wherein the first position comprises a first location on the frame of the headset adjacent to a first ear of the user and a first temple of the user;

a microphone boom configured to carry one or more microphones, wherein the microphone boom is supported by the frame through a mechanical coupling in a second position separate from the first position, wherein the second position comprises a second location on the frame of the headset adjacent to a second temple of the user opposite the first temple, and wherein the mechanical coupling is configured such that no earphone is positioned between the microphone boom and the frame of the headset;

the one or more microphones configured to receive audio signals from the user of the headset;

one or more electrical earphone wires associated with the earphone configured to carry audio signals to the earphone;

one or more electrical microphone wires associated with individual ones of the one or more microphones configured to carry audio signals from individual ones of the one or more microphones, wherein the one or more electrical microphone wires are physically separated from the one or more electrical earphone wires, and wherein the one or more electrical microphone wires are not supported by the earphone.

2. The headset of claim 1, wherein the one or more electrical earphone wires and the one or more electrical microphone wires comprise double-shielded electrical cables configured to reduce transmission of electrical signals between the one or more electrical earphone wires and the one or more electrical microphone wires.

3. The headset of claim 1, wherein the microphone boom comprises a wire-type microphone boom configured to reduce the transmission of audio signals from the user through the frame of the headset.

4. The headset of claim 1, wherein the one or more electrical microphone wires and the one or more electrical earphone wires are separate wires and are configured to reduce electrical crosstalk between the one or more electrical microphone wires and the one or more electrical earphone wires.

5. The headset of claim 4, wherein the one or more electrical microphone wires and the one or more electrical earphone wires further comprise spacers disposed between the one or more electrical microphone wires and the one or more electrical earphone wires configured to reduce electrical coupling between the one or more electrical microphone wires and the one or more electrical earphone wires.

6. The headset of claim 1, further comprising one or more physical processors configured to by machine-readable instructions to:

reduce the audio signals that are transmitted from the one or more electrical earphone wires to the one or more electrical microphone wires.

7. The headset of claim 6, wherein the one or more physical processors are configured to reduce the audio signals that are transmitted from the earphone through the frame of the headset to the one or more microphones.

8. A headset for receiving and transmitting audio signals comprising:

a frame configured to retain the headset on a user;

an earphone configured to provide audio signals to the user of the headset, wherein the earphone is supported by the headset at a first position, wherein the first position corresponds to a first location that is adjacent to a first ear of the user and a first temple of the user;

a microphone boom configured to carry one or more microphones, wherein the microphone boom is supported by the frame through a mechanical coupling in a second position separate from the first position, wherein the second position comprises a second location on the frame of the headset adjacent to a second temple of the user opposite the first temple, and wherein the mechanical coupling is configured such that no earphone is positioned between the microphone boom and the frame of the headset;

the one or more microphones configured to receive audio signals from the user of the headset;

one or more electrical earphone wires associated with the earphone configured to carry audio signals to the earphone;

one or more electrical microphone wires associated with individual ones of the one or more microphones configured to carry audio signals from individual ones of the one or more microphones, wherein the one or more electrical microphone wires are physically separated from the one or more electrical earphone wires, and wherein the one or more electrical microphone wires are not supported by the earphone.

9. The headset of claim 8, wherein the one or more electrical earphone wires and the one or more electrical microphone wires comprise double-shielded electrical cables configured to reduce transmission of electrical signals between the one or more electrical earphone wires and the one or more electrical microphone wires.

10. The headset of claim 8, wherein the microphone boom comprises a wire-type microphone boom configured to reduce the transmission of audio signals from the user through the frame of the headset.

11. The headset of claim 8, wherein the one or more electrical microphone wires is separate from the one or more electrical earphone wires and configured to reduce electrical crosstalk between the one or more electrical microphone wires and the one or more electrical earphone wires.

12. The headset of claim 11, wherein the one or more electrical microphone wires and the one or more electrical earphone wires further comprise spacers disposed between the one or more electrical microphone wires and the one or more electrical earphone wires configured to reduce electrical coupling between the one or more electrical microphone wires and the one or more electrical earphone wires.

13. A headset for receiving and transmitting audio signals comprising:

a frame configured to retain the headset on a user;

an earphone configured to provide audio signals to a user of the headset, wherein the earphone is supported by the frame of the headset at a first position;

a microphone boom configured to carry one or more microphones, wherein the microphone boom is supported by the frame through a mechanical coupling in a second position separate from the first position and on an opposite side of the frame from the first position, and wherein the mechanical coupling is configured such that no earphone is positioned between the microphone boom and the frame of the headset;

the one or more microphones configured to receive audio signals from the user of the headset; and one or more electrical wires associated with the earphone and the one or more microphones, configured to carry audio signals to the earphone and/or from the one or more microphones, wherein the one or more electrical wires carry audio signals to the earphone via a first connection of the headset, wherein the one or more electrical wires carry audio signals from the one or more microphones via a second connection of the headset, wherein the first connection and the second connection are physically separated, and wherein the one or more electrical wires carrying audio signals from the one or more microphones are not supported by the earphone.

14. The headset of claim 13, wherein the first position comprises a location on the frame of the headset adjacent a first ear of the user and the second position comprises a location on the frame of the headset adjacent a first temple of the user opposite the first ear.

15. The headset of claim 13, wherein the microphone boom comprises a wire-type microphone boom configured to reduce the transmission of audio signals from the user through the frame of the headset.

16. The headset of claim 13, further comprising one or more physical processors configured to by machine-readable instructions to:

reduce the audio signals that are transmitted from the one or more electrical earphone wires to the one or more electrical microphone wires.

17. The headset of claim 16, wherein the one or more physical processors are configured to reduce the audio signals that are transmitted from the earphone through the frame of the headset to the one or more microphones.

18. The headset of claim 13, wherein the first connection and the second connection are physically separated by one or more spacers.

* * * * *